United States Patent
Kobayashi et al.

(10) Patent No.: US 7,051,213 B1
(45) Date of Patent: May 23, 2006

(54) STORAGE MEDIUM AND METHOD AND APPARATUS FOR SEPARATELY PROTECTING DATA IN DIFFERENT AREAS OF THE STORAGE MEDIUM

(75) Inventors: Hiroyuki Kobayashi, Kawasaki (JP); Yoshiaki Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/187,700

(22) Filed: Nov. 6, 1998

(30) Foreign Application Priority Data

Mar. 18, 1998 (JP) ............................. 10-068881

(51) Int. Cl.
*H04L 9/32* (2006.01)
(52) U.S. Cl. ...................... 713/194; 380/277
(58) Field of Classification Search ................ 713/183, 713/168, 193–194; 380/286, 4, 21, 277; 365/52
See application file for complete search history.

(56) References Cited

U.S. PATENT DOCUMENTS

| | | | | |
|---|---|---|---|---|
| 4,780,905 A | * | 10/1988 | Cruts et al. ................... | 380/28 |
| 4,827,508 A | * | 5/1989 | Shear .......................... | 705/53 |
| 5,267,313 A | | 11/1993 | Hirata ......................... | 380/21 |
| 5,677,952 A | * | 10/1997 | Blakley et al. ................ | 380/4 |
| 5,682,027 A | * | 10/1997 | Bertina et al. ............... | 235/380 |
| 5,748,735 A | * | 5/1998 | Ganesan ...................... | 380/282 |
| 5,870,468 A | | 2/1999 | Harrison ...................... | 380/4 |
| 6,023,506 A | * | 2/2000 | Ote et al. .................... | 380/45 |
| 6,061,799 A | * | 5/2000 | Eldridge et al. ............ | 713/202 |
| 6,094,721 A | * | 7/2000 | Eldridge et al. ......... | 235/382.5 |
| 6,160,891 A | * | 12/2000 | Al-Salqan ................. | 380/286 |

(Continued)

FOREIGN PATENT DOCUMENTS

| | | |
|---|---|---|
| JP | 63219044 | 9/1988 |
| JP | 6421761 | 1/1989 |

(Continued)

OTHER PUBLICATIONS

B Schneier, Applied Cryptography, 1996, Wiley and Sons, Second Edition, Chapter 8, sections 1 and 7, pp. 173 and 181.*

(Continued)

*Primary Examiner*—Matthew Smithers
*Assistant Examiner*—Minh Dieu Nguyen
(74) *Attorney, Agent, or Firm*—Greer, Burns & Crain, Ltd.

(57) ABSTRACT

Disclosed are a method and an apparatus for protecting data on a storage medium by encrypting the data to be recorded on the storage medium with a password. This method comprises a step of, generating, for changing key data on each memory unit by one password, the key data, thereafter encrypting the key data with the password and writing the encrypted data to the storage medium, and a step of encrypting the data with the key data and encrypted data to the storage medium. The method further comprises a step of reading the encrypted key data from the storage medium, a step of decoding the encrypted key data with the password, and a step of decoding the data on the storage medium with the decoded key data. The encryption is done by using the key data generated separately from the password, and it is therefore feasible to prevent the password from being analyzed by decoding a cipher text.

21 Claims, 15 Drawing Sheets

U.S. PATENT DOCUMENTS

| | | | |
|---|---|---|---|
| 6,178,508 B1 * | 1/2001 | Kaufman | 713/183 |
| 6,199,163 B1 * | 3/2001 | Dumas et al. | 713/183 |
| 6,233,565 B1 * | 5/2001 | Lewis et al. | 705/26 |
| 6,324,287 B1 * | 11/2001 | Angert | 380/262 |

FOREIGN PATENT DOCUMENTS

| | | |
|---|---|---|
| JP | 7085574 | 3/1995 |
| JP | 7176134 | 7/1995 |
| JP | 8069357 | 3/1996 |
| JP | 9335182 | 12/1996 |
| JP | 9-293021 | 11/1997 |

OTHER PUBLICATIONS

Schneier, Bruce, Applied Cryptography, John Wiley & Sons, Inc., 2$^{nd}$ ed., pp. 5-6 and 173.*

Petreley, Security Report: Windows vs Linux, Oct. 22, 2004, pp. 8 of 32.*

Kaplan, Marc A, *IBM Cryptolopes , SuperDistribution and Digital Rights Management,* Dec. 12, 1996, http://www.research.ibm.com/people/k/kaplan.

* cited by examiner

STORAGE MEDIUM AND METHOD AND APPARATUS FOR SEPARATELY PROTECTING DATA IN DIFFERENT AREAS OF THE STORAGE MEDIUM

BACKGROUND OF THE INVENTION

1. Field of the Invention

The present invention relates to a method of and an apparatus for protecting data on a storage medium, which are intended to protect the data to be recorded on the storage medium by encrypting the data with a password, and to the storage medium thereof in an information processing appliance.

2. Description of the Related Art

A storage device utilizing an optical disk, a magnetic disk and an IC card etc, is utilized for a variety of information processing appliances such as a computer, a word processor and an electronic book etc. Information such as information related to privacy and confidential information in terms of duties, which should not be known by persons other than an owner, might be written to this type of storage device. It is required that the data be encrypted in order to make such information unknown by others.

FIG. 15 is an explanatory diagram showing the prior art.

A password is set on a storage medium 90 such as an optical disk etc or on a storage device. When writing the data, an encrypting unit 91 encrypts the data with the password, and the encrypted data is written to the storage medium 90. Further, when reading the data, a decoding unit 92 decodes the data on the storage medium 90 with a password.

Thus, a data confidentiality can be kept by encrypting the data. In this connection, there has hitherto been a method of setting one password on the whole storage medium. There also has been a method of setting passwords different based on a file unit of the storage medium.

First, as cipher texts defined as samples or combinations of the cipher texts with unencrypted plain texts become larger in quantity, the decryption by a decipherer becomes easier. As a result, the same plain text is encrypted with the same password. Therefore, when encrypted directly with the same password, a statistic characteristic of the cipher text reflects in a statistic character of the plain text. Accordingly, a conventional method of encrypting with the same password on the storage medium presents such a problem that if a volume of the cipher texts is large enough to make a statistic process executable, the characteristics of the plain texts can be presumed easily.

Second, data is stored in a large capacity storage medium such as an optical disk etc. A portion of the data such as a directory portion is structured in a fixed format. A problem peculiar to the conventional method of encrypting with the same password on the storage medium is that the password is presumed by analyzing this portion, in which case other vital data are to be deciphered.

Third, according to the conventional method of setting the password per file, when the password of some portion is decrypted, other portions can be prevented from being decrypted. In this case, however, it is required that the different password be managed per file. This operation is troublesome and might cause a problem in which a fault such as forgetting the password and so on can easily occur.

Fourth, in the large capacity exchangeable storage medium such as an optical disk etc, it is possible to take the storage medium out and copy the storage medium. Therefore, the once-encrypted data is carried out and may be analyzed later on taking a sufficient period of time. Accordingly, the problem is that the password is easy to be presumed form the cipher text.

A fifth problem is that the data has hitherto been encrypted directly with the password, and hence, if the password is changed, the whole data are required to be re-encrypted.

SUMMARY OF THE INVENTION

It is a primary object of the present invention to provide a method of and an apparatus for protecting data on a storage medium, wherein a password is not easily discovered from a cipher text.

It is another object of the present invention to provide a method of and an apparatus for protecting data on a storage medium that are capable of changing key data with one password on a memory unit.

It is still another object of the present invention to provide a method of and an apparatus for protecting data on a storage medium, wherein re-encryption of data is not needed even when a password is changed.

A method of protecting data on a storage medium according to the present invention has a write mode including a step of encrypting, after generating key data, the key data with a password and writing the encrypted key data to the storage medium, and a step of encrypting data with the key data and writing the encrypted data to the storage medium. The data protecting method also has a read mode including a step of reading the encrypted key data from the storage medium, a step of decoding the encrypted key data with the password, and a step of decoding the data on the storage medium with the decoded key data.

According to the present invention, the data is encrypted not by using the password directly as an encryption key but by using key data generated separately. The key data is encrypted with the password serving as a key, and written to the storage medium. When in the reading process, the encrypted key data is decoded with the password, thereby obtaining the key data. Then, the data is decoded with the key data.

Thus, the data is encrypted by use of the key data generated separately from the password, whereby the encrypted key data is, even if a cipher text is to be analyzed, merely decrypted. The password and the key data are therefore hard to analyze. This makes it feasible to prevent the password from being deciphered by analyzing the cipher text.

Further, since the encryption is done using the key data generated separately from the password, a key different based on the memory unit such as a sector etc can be imparted to one password by changing the key data. Consequently, the encryption can be accomplished by use of the key different per logic sector, whereby a data confidentiality can be enhanced.

Furthermore, the encryption is carried out by using the key data generated separately from the password, and therefore, even if the password is changed, the data is not required to be re-encrypted. Hence, the password can be easily changed on even a storage medium having a capacity as large as several hundred mega bytes.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
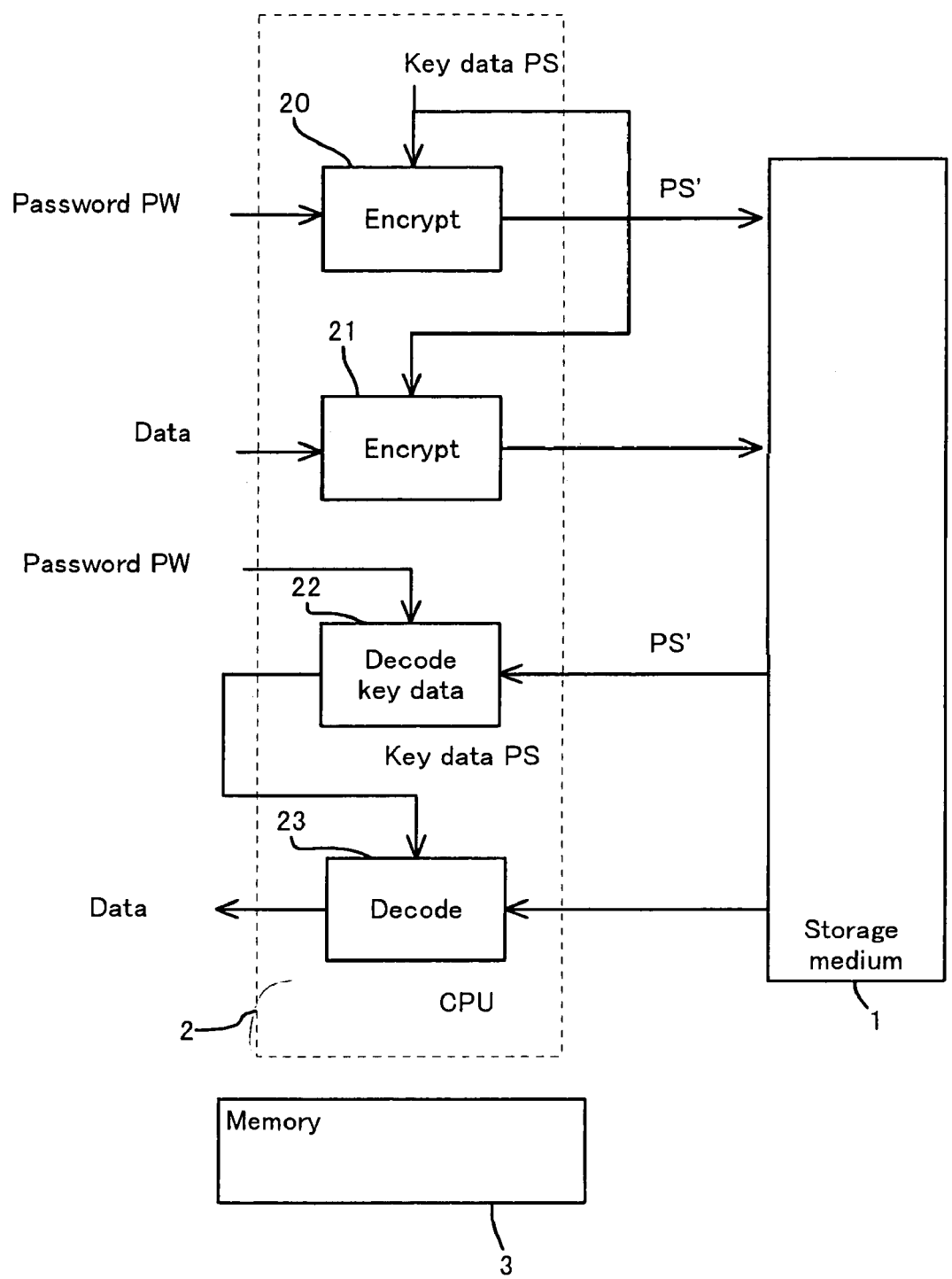
FIG. 1 is a block diagram showing one embodiment of the present invention.
Figure 2:
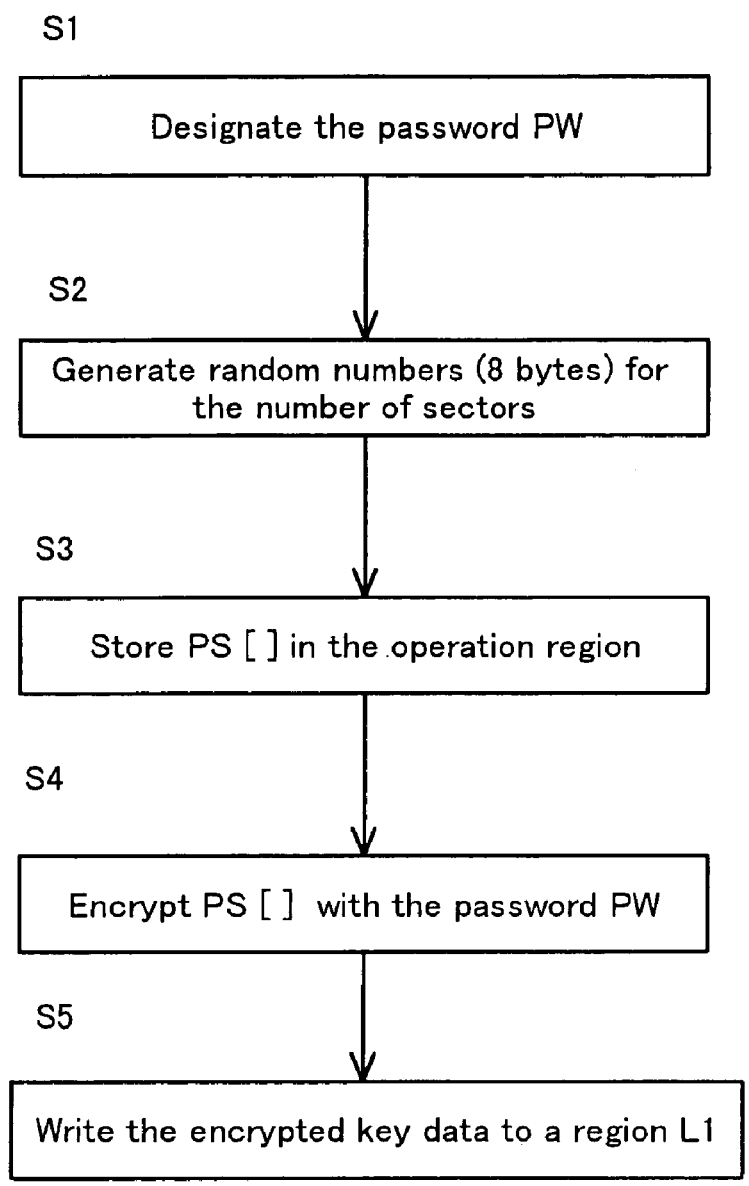
FIG. 2 is a processing flowchart when in a logical formatting process in a first embodiment of the present invention.
Figure 3:
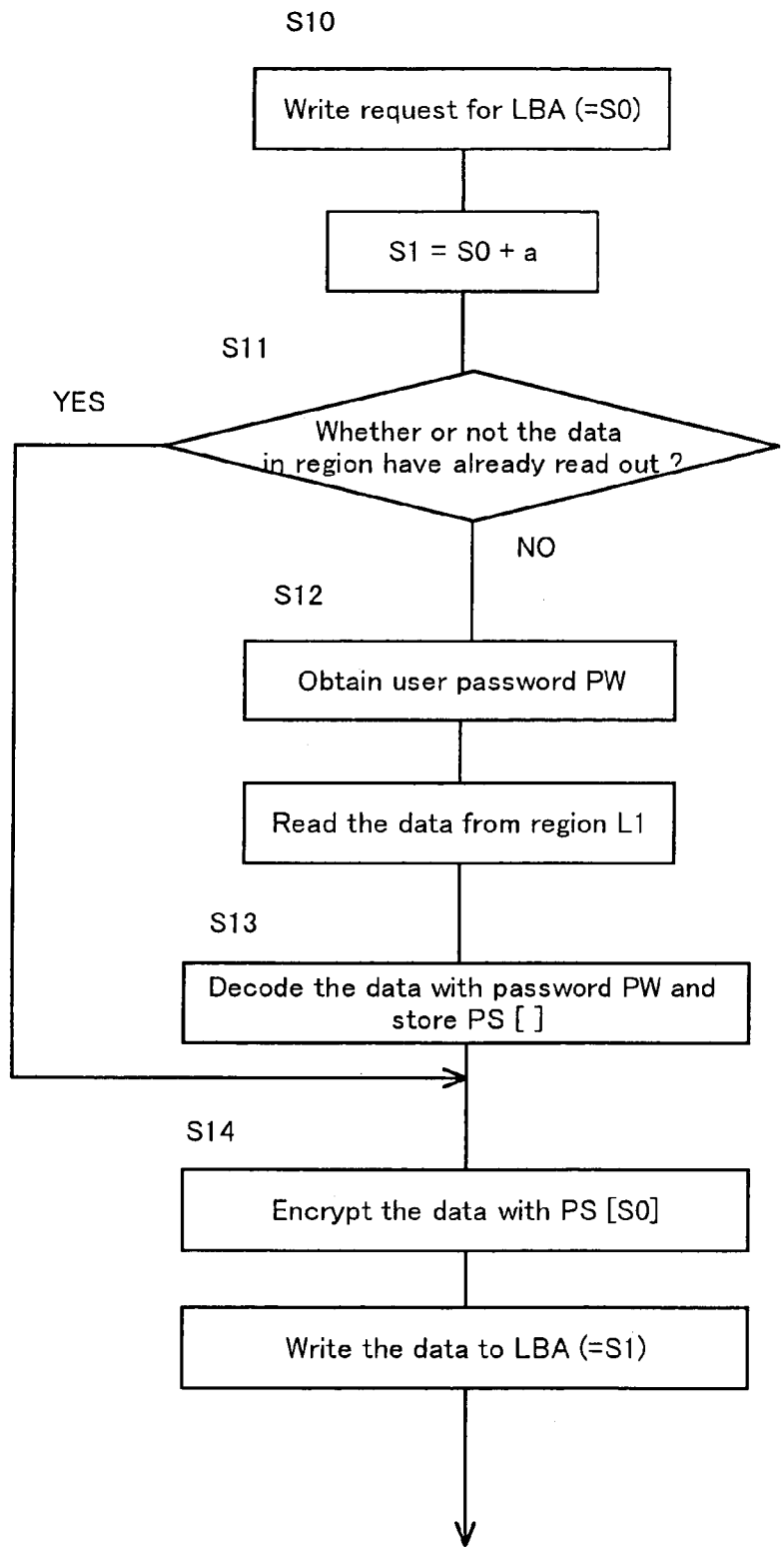
FIG. 3 is a flowchart showing a writing process in the first embodiment of the present invention.
Figure 4:
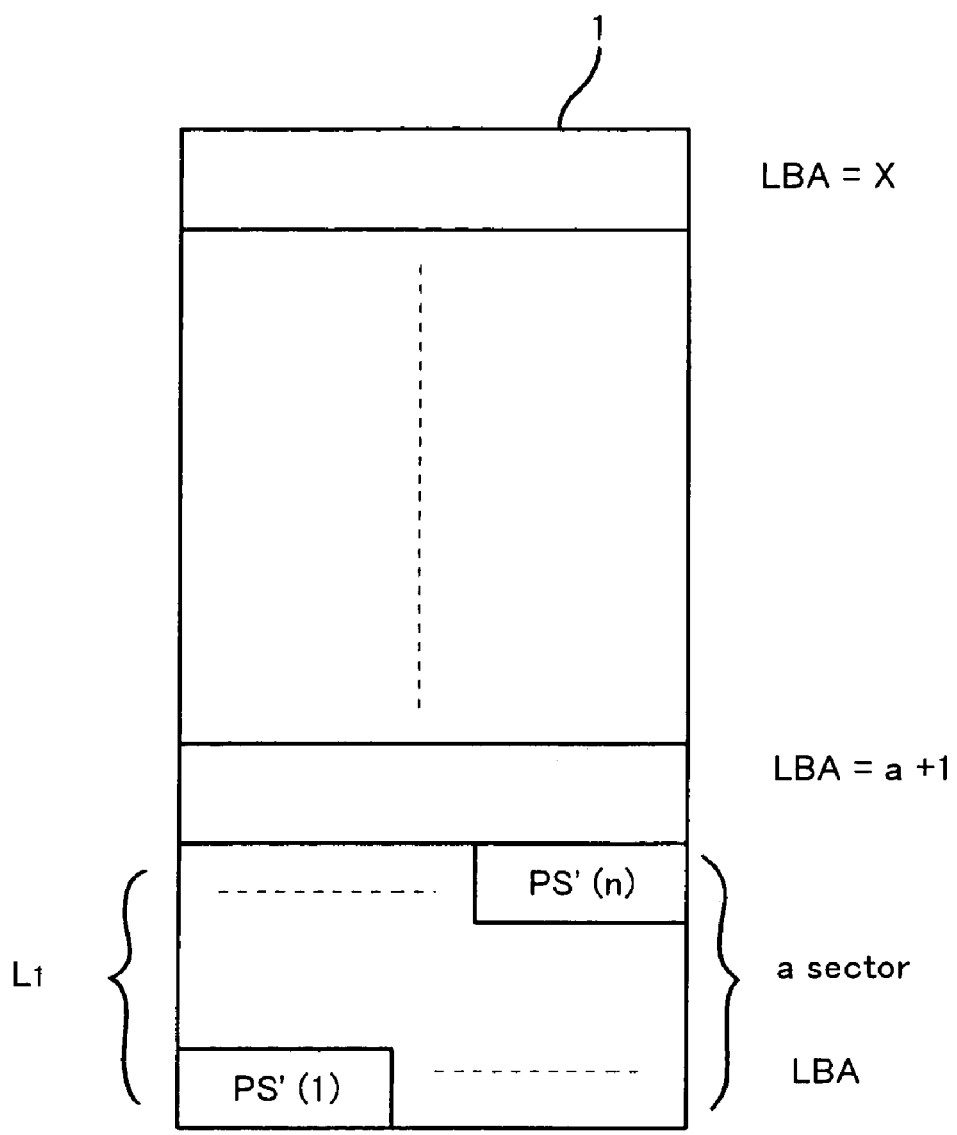
FIG. 4 is an explanatory diagram showing a storage region in the first embodiment of the present invention.
Figure 5:
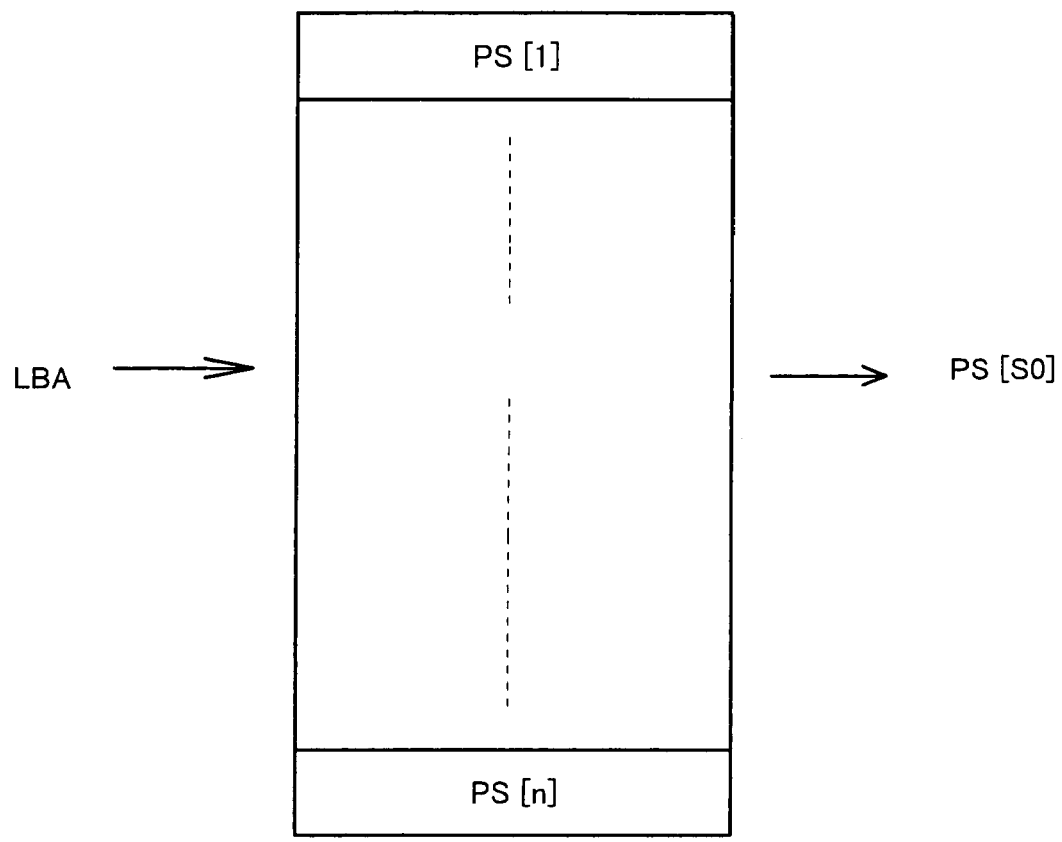
FIG. 5 is an explanatory diagram showing key data in the first embodiment of the present invention.
Figure 6:
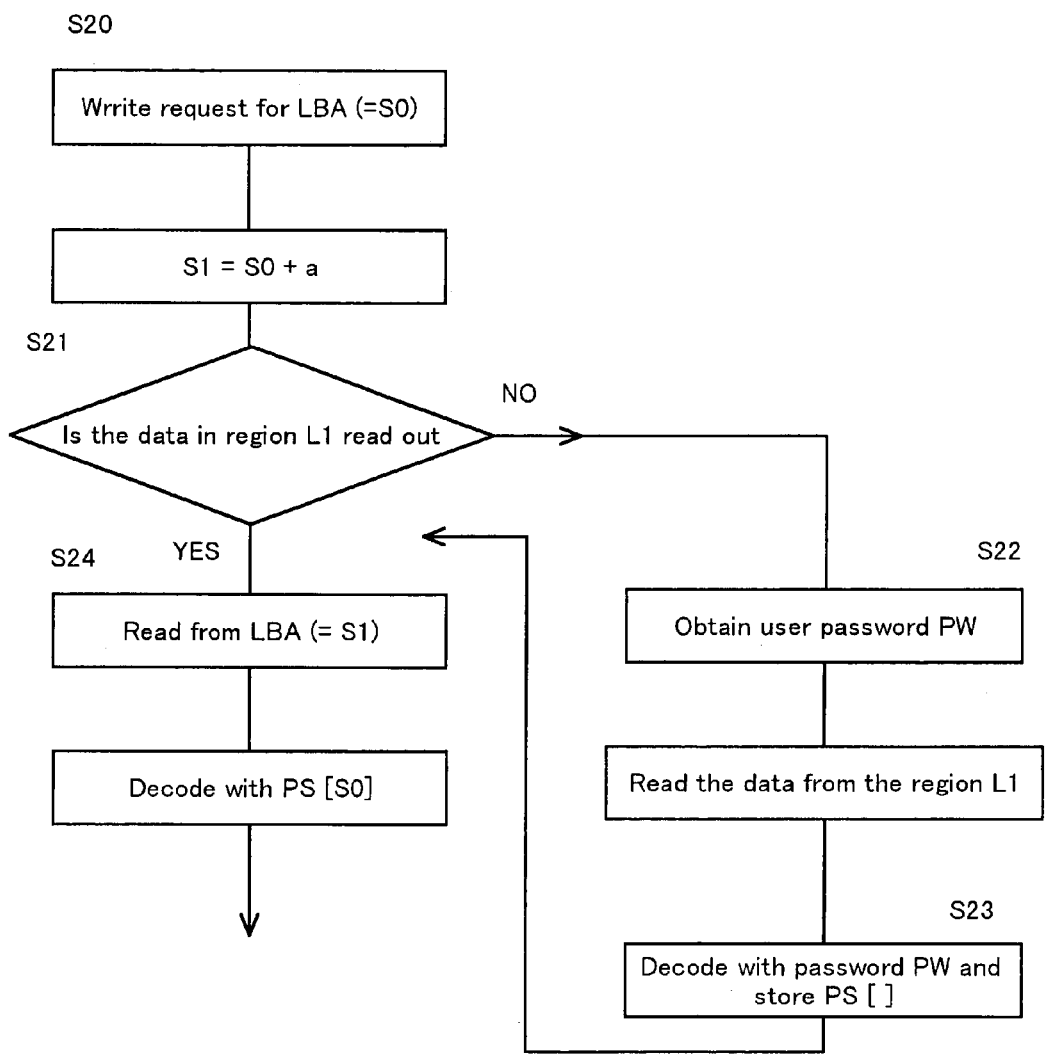
FIG. 6 is a flowchart showing a reading process in the first embodiment of the present invention.

FIG. 1 is a block diagram showing one embodiment of the present invention. FIG. 2 is a processing flowchart when in a logical format in a first embodiment of the present invention. FIG. 3 is a flowchart showing a writing process in the first embodiment of the present invention. FIG. 4 is an explanatory diagram showing a storage area in the first embodiment of the present invention. FIG. 5 is an explanatory diagram showing key data in the first embodiment of the present invention. FIG. 6 is a flowchart showing a reading process in the first embodiment of the present invention.

As shown in FIG. 1, a storage medium 1 is constructed of a magneto-optic disk. A logic sector size of the storage medium 1 is set to 2 KB (kilo bytes). A control circuit 2 is constructed of a processor. A first encrypting unit 20 encrypts key data PS with a password PW inputted by a user, and writes encrypted key data PS' onto the storage medium 1.

A second encrypting unit 21 encrypts the data to be written with the key data PS, and writes the encrypted data onto the storage medium 1. A first decoding unit 22 decodes with the password PW the key data PS' encrypted on the storage medium 1. A second decoding unit 23 decodes the data on the storage medium 1 with the key data PS decoded, and outputs the data. A memory 3 provides an operation region of a control circuit (hereinafter referred to as a CPU). Note that the first and second encrypting units 20, 21 and the first and second decoding units 22, 23 are shown in the form of blocks as processes by the CPU 2.

Referring to FIG. 2, a process when creating a logical format of the medium will be explained. The following processes are executed when creating the medium logical format defined as an initial process of the medium.

(S1) The user inputs the user password PW to the CPU 2.

(S2) The CPU 2 generates random numbers (each consisting of 8 bytes) for the number of sectors. This random number is defined as the key data PS. Hereinafter, the explanation is given on the assumption that "n" be the number of sectors, and random numbers PS[1]–PS[n] be generated.

(S3) The CPU 2 makes the random numbers (random data) PS (PS[1]–PS [n]) for the number of sectors stored in the operation region of the memory 3.

As illustrated in FIG. 4, the logical format of the storage medium (disk) 1 is shown by each sector. This sector is addressed based on a logical block address LBA. Herein, in FIG. 4, there are provided X-pieces of sectors of logical block addresses LBA being [1] through [X].

The region L1 for a sector starting from a head sector (LBA=1) within the storage area of the optical disk, is allocated as a storage region for the encrypted key data PS'[1]–PS'[n], namely, the number of sectors in a use region of the data is n (=(X–a)), and, per section in the use region, the encrypted key data PS'[1]–PS'[n] are stored in the region L1.

Next, a writing process to the medium will be explained with reference to FIG. 3.

(S10) It is assumed that there occurs a request for writing to a position in which the logical block address (sector number) LBA is [S0]. The sector number LBA requested is changed to [S1] so that the write request position is not overlapped with the region L1. Herein, as shown in FIG. 4, a size [a] of the region L1 is added to the sector number [S0], thereby obtaining the changed sector number [S1].

(S11) The CPU 2 judges whether or not the data (encrypted key data) in the region L1 on the optical disk 1 have already been read out. If already read out, the key data are developed in the operation region of the memory 3, and hence the processing proceeds to step S14.

(S12) The CPU 2, if the data in the region L1 have not been read out, executes a process of developing the key data in the operation region of the memory 3. Namely, the CPU 2 obtains the user password PW. Then, the CPU 2 reads the data PS'[1]–PS'[n] from the region L1 on the optical disk 1.

(S13) The CPU 2 decodes the data PS'[1]–PS'[n] in the region L1 with the password PW. The data PS'[1]–PS'[n] are thereby obtained. The data PS'[1]–PS'[n] are stored in the operation region of the memory 3.

(S14) The CPU 2 obtains key data PS[S0] of the logical block address (sector number) LBA (=S0) out of the key data in the operation region of the memory 3. As shown in FIG. 5, the key data PS [S0] corresponding to the logical block address LBA is obtained from a key data table in the operation region of the memory 3. Then, the CPU 2 encrypts the data to be written with this piece of key data PS[S0]. An encrypting method may involve the use of known DES etc.

(S15) The CPU 2 writes the encrypted data to a position of the logical block address LBA (=S1) on the optical disk 1.

Next, the reading process will be described referring to FIG. 6.

(S20) It is presumed that there occurs a request for reading from a position where the logical block address (sector number) LBA is [S0]. The sector number LBA requested is changed to [S1] so that the read request position is not overlapped with the region L1. Herein, as shown in FIG. 4, the size [a] of the region L1 is added to the sector number [S0], thereby obtaining the changed sector number [S1].

(S21) The CPU 2 judges whether or not the data (encrypted key data) in the region L1 on the optical disk 1 have already been read out. If already read out, since the key data are developed in the operation region of the memory 3, the processing proceeds to step S24.

(S22) The CPU 2, if the data in the region L1 have not been read out, executes a process of developing the key data in the operation region of the memory 3. Namely, the CPU 2 obtains the user password PW. Then, the CPU 2 reads the data PS'[1]–PS'[n] from the region L1 on the optical disk 1.

(S23) The CPU 2 decodes the data PS'[1]–PS'[n] in the region L1 with the password PW. The key data PS[1]–PS[n] are thereby obtained. The key data PS[1]–PS[n] are stored in the operation region of the memory 3.

(S24) The CPU 2 obtains key data PS[S0] of the logical block address (sector number) LBA (=S0) out of the key data in the operation region of the memory 3. As shown in FIG. 5, the key data PS [S0] corresponding to the logical block address LBA is obtained from the key data table in the operation region of the memory 3. Then, the CPU 2 reads in the logical block address S1 from the optical disk 1. Further, the CPU 2 decodes the thus read data with the key data PS[S0]. A decoding method may involve the use of known DES etc. The CPU 2 transmits the decoded data to a requesting terminal (e.g., a computer).

Thus, when creating the logical format of the medium, the random number is generated per logic sector, thereby generating the key data per logic sector. Then, the key data encrypted with the password is written to the storage medium 1. When in the data writing process, the data are encrypted with the key data and written to the storage medium 1.

When in the data reading process, the encrypted key data on the storage medium 1 are read and thereafter decoded with the password, thereby obtaining the key data. Then, the data read from the storage medium are decoded with this piece of key data.

As described above, the data are encrypted with the key data generated separately from the password, with the result that the encrypted key data is, even if a cipher text is analyzed, merely decoded. Therefore, the password and the key data are analyzed with difficulty. This makes it possible to prevent the password from being decoded by analyzing the cipher text.

Further, the encryption is executed by using the key data generated separately from the password, and therefore a different key can be imparted based on the logic sector unit by changing the key data with respect to one password. Hence, the data can be encrypted by using the different key per logic sector, whereby the confidentiality of the data can be enhanced.

Note that the region L1 is provided in the part of the smaller logical block address but may be stored in a part of the maximum logical block address.

Figure 7:
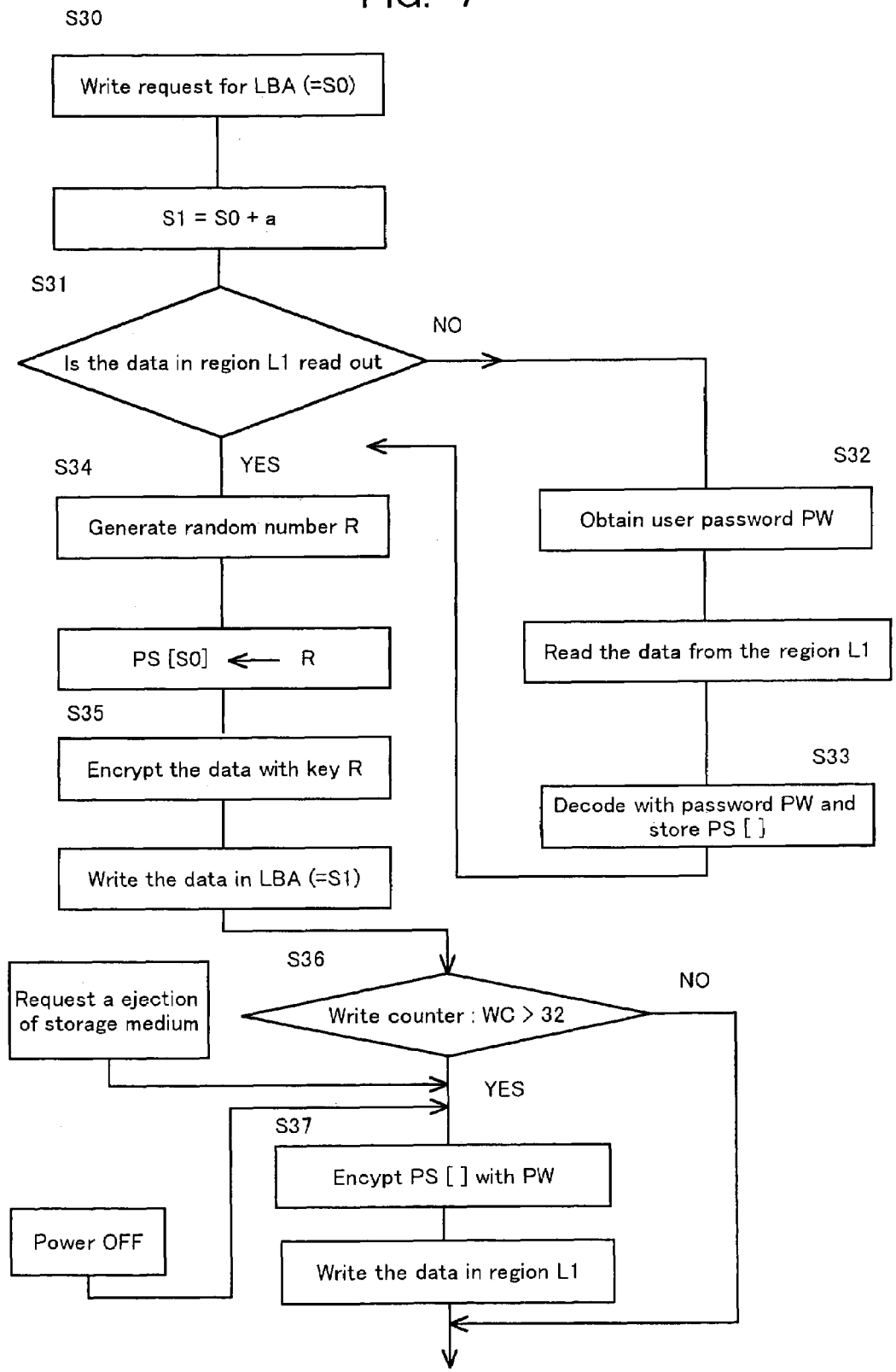
FIG. 7 is a flowchart showing a writing process in a second embodiment of the present invention.

FIG. 7 is a flowchart showing a writing process in a second embodiment of the present invention. Referring to FIG. 7, the writing process to the medium will be explained. The process in the case of creating the logical format of the medium is executed in the same way as done in the embodiment in FIG. 2, the encrypted key data of each logic sector is stored on the storage medium 1.

(S30) It is presumed that there occurs a request for writing to a position where the logical block address (sector number) LBA is [S0]. The sector number LBA requested is changed to [S1] so that the write request position is not overlapped with the region L1. Herein, as shown in FIG. 4, the size [a] of the region L1 is added to the sector number [S0], thereby obtaining the changed sector number [S1].

(S31) The CPU 2 judges whether or not the data (encrypted key data) in the region L1 on the optical disk 1 have already been read out. If already read out, since the key data are developed in the operation region of the memory 3, the processing proceeds to step S34.

(S32) The CPU 2, if the data in the region L1 have not been read out, executes the process of developing the key data in the operation region of the memory 3. Namely, the CPU 2 obtains the user password PW. Then, the CPU 2 reads the data PS'[1]–PS'[n] from the region L1 on the optical disk 1.

(S33) The CPU 2 decodes the data PS'[1]–PS'[n] in the region L1 with the password PW. The key data PS[1]–PS [n] are thereby obtained. The key data PS[1]–PS [n] are stored in the operation region of the memory 3.

(S34) The CPU 2 generates a random number R. Subsequently, the CPU 2 writes the random number R to the key data PS[S0] in the key data logical block address (sector number) LBA (=S0) in the operation region of the memory 3.

(S35) Then, the CPU 2 encrypts the data to be written with this piece of key data (random number R). The encrypting method may involve the use of known DES etc. The CPU 2 writes the encrypted data to a position of the logical block address LBA (=S1) on the optical disk 1.

(S36) The CPU 2 rewrites the data in the region L1 on the optical disk 1 at a proper timing. That is, the CPU 2, if a value WC of a write counter for indicating the number of writing processes exceeds, e.g., 32, proceeds to step S37 in order to rewrite the data in the region L1 for insurance. It is the reason why the writing process is done at an interval of a predetermined number of times that a data recovery of some extent is to be compensated even if there occurs such a situation that a process of ejecting the medium can not be executed due to an occurrence of something abnormal. The numerical value such as 32 times may be arbitrary. This process is not the indispensable condition for the present invention. Further, the CPU 2, when requested to eject the storage medium 1, proceeds to step s37 in order to save the key data. Moreover, the CPU 2, of the power source is switched OFF, advances to step S37 to save the key data.

(S37) The CPU 2 encrypts each piece of the key data PS [1]–PS[n] in the operation region with the password PW. As a matter of course, the whole key data PS[1]–PS[n] in the operation region may also been crypted with the password. Next, the CPU 2 writes the encrypted key data PS'[1]–PS'[n] to the region L1 on the storage medium 1.

In accordance with the second embodiment, in addition to the operation in the first embodiment, the different key data is generated each time the data is written. Therefore, the encryption is executed using the different key data each time the data is written, thereby enhancing the confidentiality of the data.

Note that the reading process is the same as in the first embodiment in FIG. 6, so that its explanation is omitted.

Figure 8:
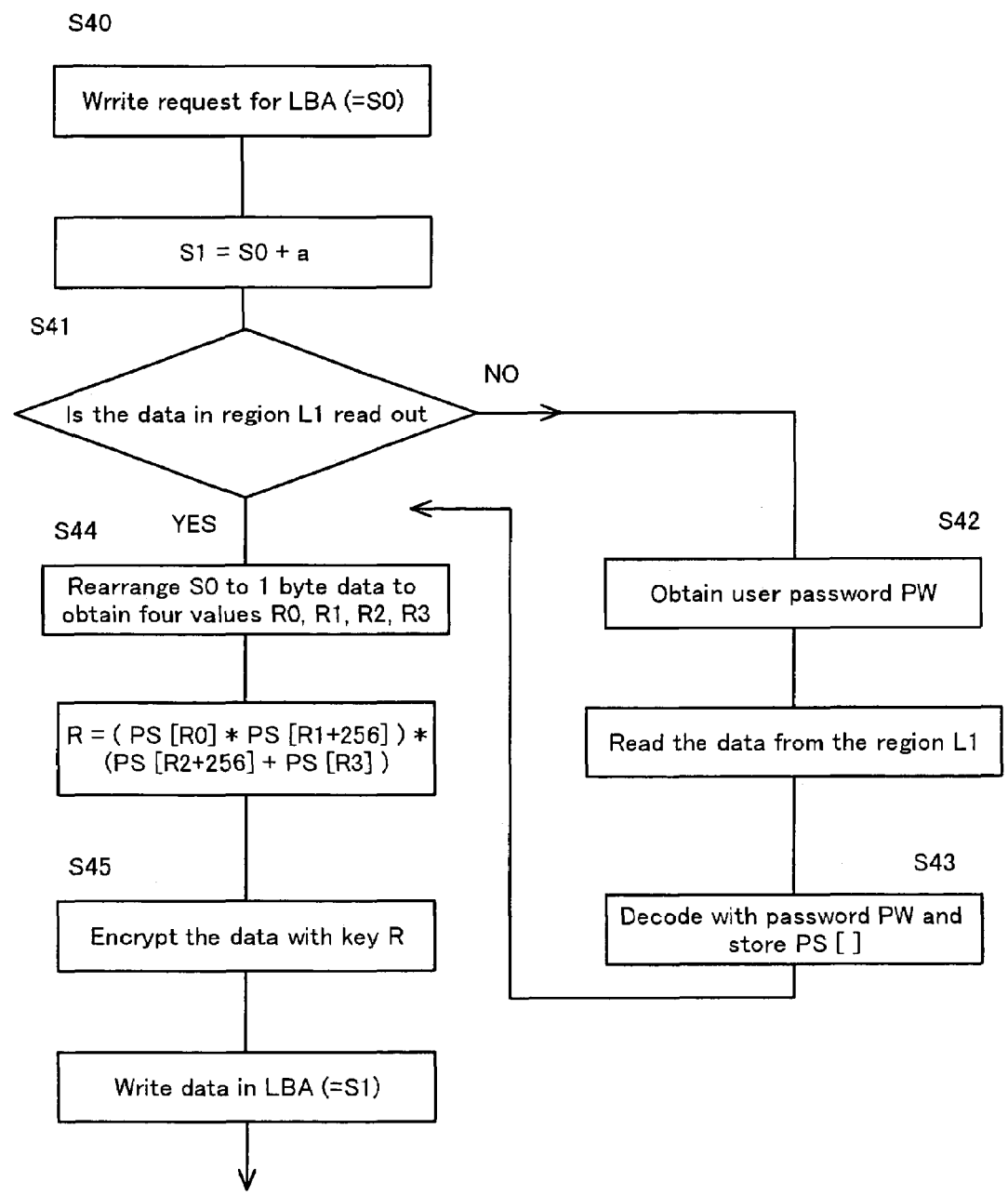
FIG. 8 is a flowchart showing the writing process in a third embodiment of the present invention.
Figure 9:
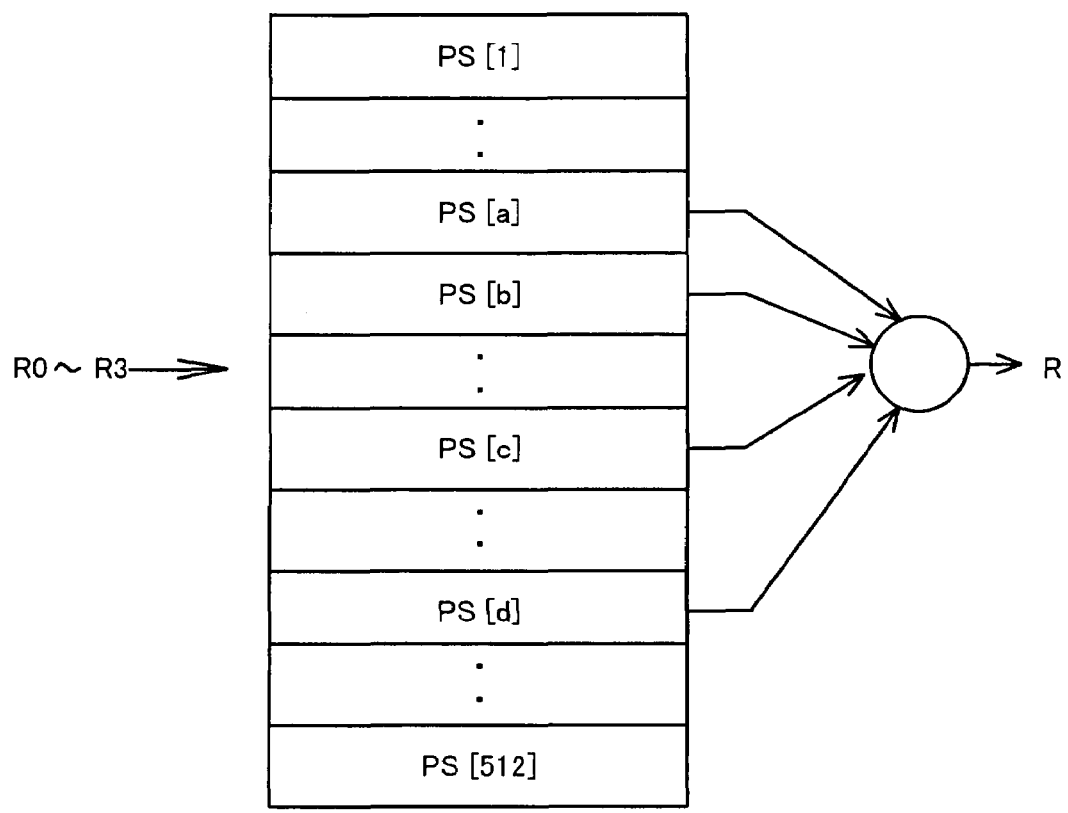
FIG. 9 is an explanatory diagram showing the key data in the third embodiment of the present invention.
Figure 10:
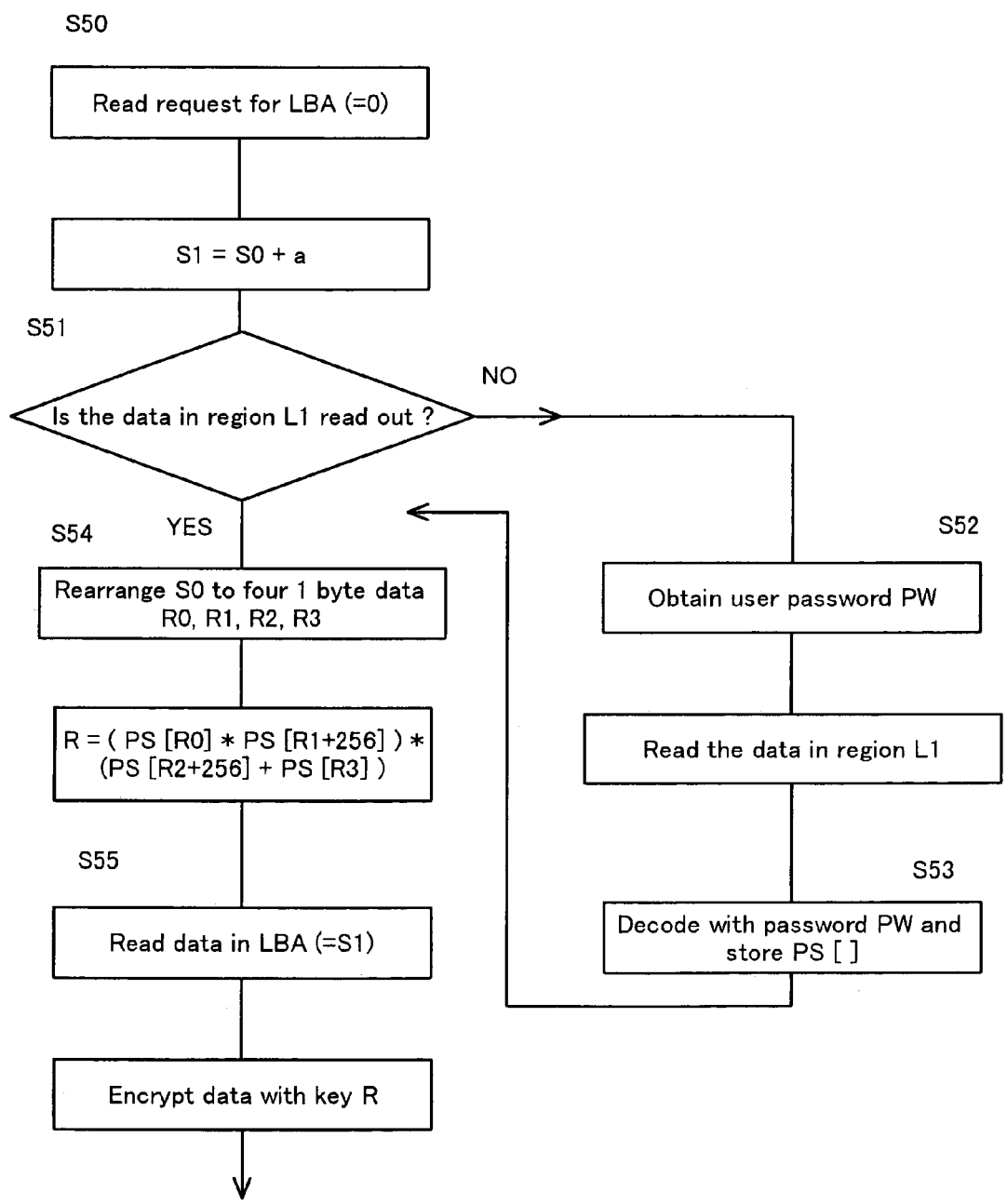
FIG. 10 is a flowchart showing the reading process in the third embodiment of the present invention.

FIG. 8 is a flowchart showing a writing process in a third embodiment of the present invention. FIG. 9 is an explanatory diagram showing the key data in the third embodiment of the present invention. FIG. 10 is a flowchart showing the reading process in the third embodiment of the present invention.

When in a medium logical formatting process, as in the first embodiment shown in FIG. 2, the region L1 on the optical disk 1 is stored with encrypted key data PS'[1]–PS'[512]. Herein, however, the encrypted data is not stored per logic sector. For example, it is assumed that a capacity of the region L1 be 4 KB. Then, supposing that the password [be] is an 8-byte/entry, as shown in FIG. 9, 512-pieces of key words (entries) PS[1]–PS[512] are generated. Subsequently, the region L1 is stored with the 512-pieces of encrypted key words PS'[1]–PS'[512].

The writing process is described with reference to FIG. 8.

(S40) It is presumed that there occurs a request for writing to a position where the logical block address (sector number) LBA is [S0]. The sector number LBA requested is changed to [S1] so that the write request position is not overlapped with the region L1. Herein, as shown in FIG. 4, the size [a] of the region L1 is added to the sector number [S0], thereby obtaining the changed sector number [S1].

(S41) The CPU 2 judges whether or not the data (encrypted key data) in the region L1 on the optical disk 1 have already been read out. If already read out, since the key data are developed in the operation region of the memory 3, the processing proceeds to step S44.

(S42) The CPU 2, if the data in the region L1 have not been read out, executes the process of developing the key data in the operation region of the memory 3. Namely, the CPU 2 obtains the user password PW. Then, the CPU 2 reads the data PS'[1]–PS'[n] from the region L1 on the optical disk 1.

(S43) The CPU 2 decodes the data PS'[1]–PS'[n] in the region L1 with the password PW. The key data PS[1]–PS[n] are thereby obtained. The key data PS[ ] (PS[1]–PS[n]) are stored in the operation region of the memory 3.

(S44) The CPU 2 obtains four values R0, R1, R2, R3 from the sector number S0 requested. Herein, the logic sector number S0 is assumed to be a bit string of 32 bits, and 32 bits are rearranged by 8 bits to the individual values R0, R1, R2, R3. R0–R3 take values above 0 but less then 256. Then, with R0–R3 serving as an index, random number values (key data) are taken out of PS[ ] in the operation region of the memory 3. Based on the thus taken-out four values, an 8-byte random number (key data) R is generated.

Herein, as shown in FIG. 9, the key data PS[R0] corresponding to R0 is taken out, and key data [R1+256] corresponding to (R1+256) is taken out. Key data PS [R2+256] corresponding to R2 is taken out, and key data PS [R3] corresponding to R3 is taken out.

Then, the key data R is calculated by the following arithmetic formula:

$$R=(PS[R0]*PS[R1+256])*(PS[R2+256]+PS[R3])$$

where [*] represents an EOR calculation.

(S45) Then, the CPU 2 encrypts the data to be written with this piece of key data R. The encrypting method may involve the use of known DES etc. The CPU 2 writes this piece of encrypted data to a position of the logical block address LBA (=S1) on the optical disk 1.

Next, the reading process is explained with reference to FIG. 10.

(S50) It is presumed that there occurs a request for reading from a position where the logical block address (sector number) LBA is [S0]. The sector number LBA requested is changed to [S1] so that the read request position is not overlapped with the region L1. Herein, as shown in FIG. 4, the size [a] of the region L1 is added to the sector number [S0], thereby obtaining the changed sector number [S1].

(S51) The CPU 2 judges whether or not the data (encrypted key data) in the region L1 on the optical disk 1 have already been read out. If already read out, the key data are developed in the operation region of the memory 3, and hence the processing proceeds to step S54.

(S52) The CPU 2, if the data in the region L1 have not been read out, executes the process of developing the key data in the operation region of the memory 3. Namely, the CPU 2 obtains the user password PW. Then, the CPU 2 reads the data PS'[1]–PS'[n] from the region L1 on the optical disk 1.

(S53) The CPU 2 decodes the data PS'[1]–PS'[n] in the region L1 with the password PW. The key data PS[1]–PS[n] are thereby obtained. The key data PS[ ] (PS [1]–PS [n]) are stored in the operation region of the memory 3.

(S54) The CPU 2 obtains the four values R0, R1, R2, R3 from the sector number S0 requested. Herein, the logic sector number S0 is assumed to be a bit string of 32 bits, and 32 bits are rearranged by 8 bits to the individual values R0, R1, R2, R3. R0–R3 take values above 0 but less then 256. Then, with R0–R3 serving as an index, random number values (key data) are taken out of PS[ ] in the operation region of the memory 3. Based on the thus taken-out four values, the 8-byte random number (key data) R is generated.

Herein, as shown in FIG. 9, the key data PS[R0] corresponding to R0 is taken out, and the key data [R1+256] corresponding to (R1+256) is taken out. The key data PS [R2+256] corresponding to R2 is taken out, and the key data PS [R3] corresponding to R3 is taken out. Then, the key data R is calculated by the above-mentioned arithmetic formula.

(S55) Then, the CPU 2 reads the data in the logical block address LBA (=S1) from the optical disk 1. Further, the CPU 2 decodes the read data with this piece of key data R. The decoding method may involve the use of known DES etc.

The size of the region L on the optical disk 1 can be made smaller in the third embodiment than in the first embodiment. Namely, it is required in the first embodiment that the same number of pieces of key data as the number of the logic sectors be stored. For instance, supposing that one sector is 2 KB, the storage capacity be 600 MB and the key data by 8 bytes, the region L1 is required to have a capacity of 2.4 MB. In the third embodiment, 512-pieces of key data are stored, and therefore approximately 4 KB may suffice for the region L1.

Besides, even with such settings, the random number is generated based upon the calculation, and hence the key data different per sector can be obtained.

Figure 11:
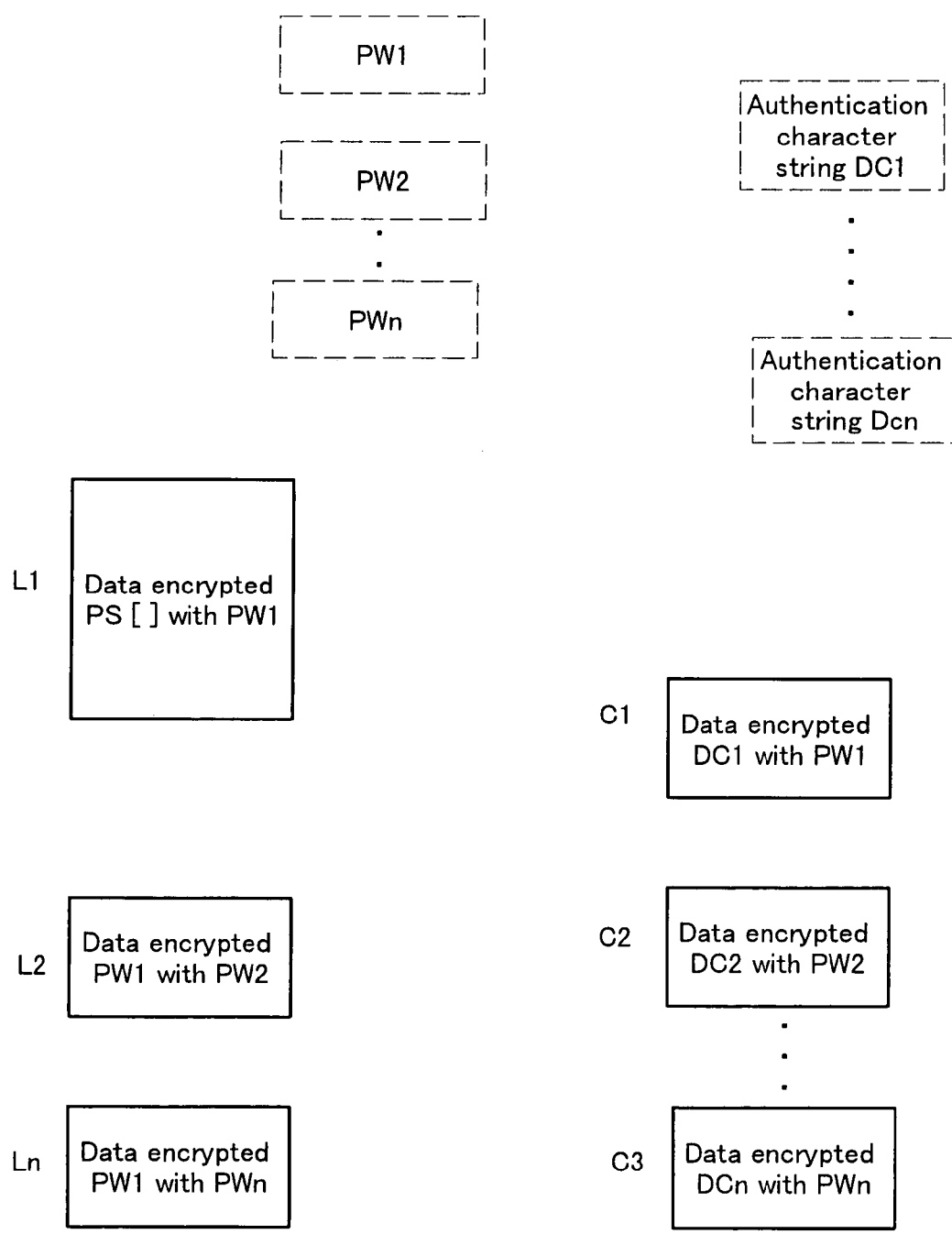
FIG. 11 is an explanatory diagram showing a fourth embodiment of the present invention.
Figure 12:
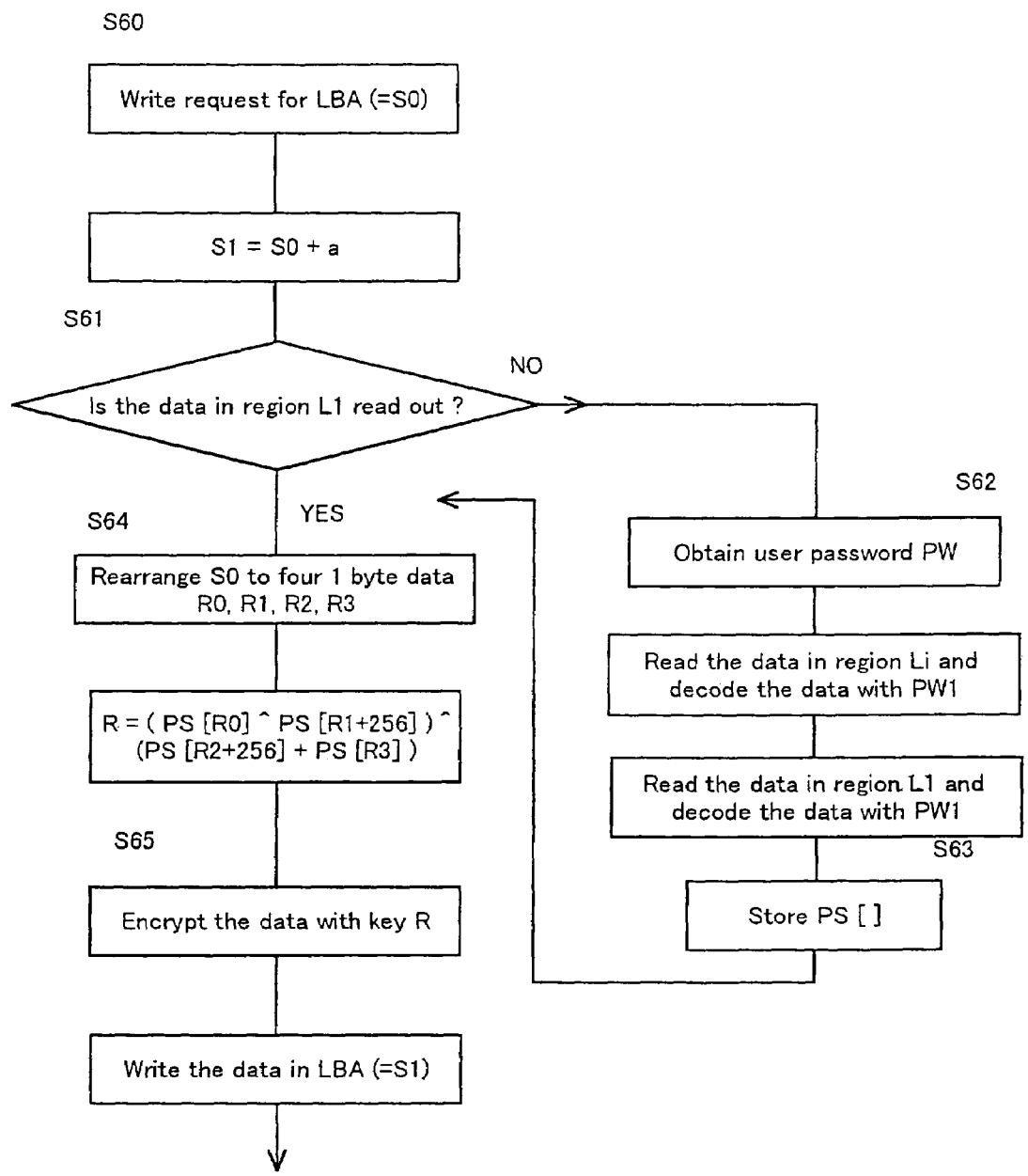
FIG. 12 is a flowchart showing a writing process in the fourth embodiment of the present invention.

FIG. 11 is an explanatory diagram showing a fourth embodiment of the present invention. FIG. 12 is a flowchart showing the writing process in the fourth embodiment of the present invention.

The fourth embodiment shows, in addition to what has been shown in the third embodiment, a method capable of using a plurality of user passwords. As shown in FIG. 11, an n-number of users are accepted, and therefore passwords PW1–PWn are set per user. On the assumption that the password consists of 8 bytes, corresponding to each user, the optical disk 1 is provided with 8-byte (a size of PW1) regions L2–Ln and 8-byte regions C1–Cn.

When creating the logical format of the storage medium, as in the third embodiment, what is obtained by encrypting the random number data with the user password PW1 is written to the region L1.

In addition, an authentication character string DC1 of the password is generated, and what is obtained by encrypting the character string DC1 with the password PW1 is written to the region C1. Further, what is obtained by encrypting the password PW1 with PW2 is written to the region L2, and what results from encryption of the password PW1 with PWn is written to the region Ln.

Moreover, what is acquired by encrypting an authentication character string DC2 of the password PW2 with the password PW2, is written to the region C2. Hereinafter, what results from encryption of the authentication character string DCn of the password PWn with the password PWn, is written to the region Cn.

The authentication character string of each password serves to authenticate whether the inputted password is correct or not. This authentication character string may be structured of a confidential character string peculiar to the system or composed of a value (e.g., an exclusive OR of a password PWi and a certain specified character string) calculated from the password Pwi.

Next, the data writing/reading process in the case of using the user password is executed in the same way with the third embodiment shown in FIGS. 8 and 10.

The data writing process when using the user password PWi (i>1) is explained referring to FIG. 12.

(S60) It is presumed that there occurs a request for writing to a position where the logical block address (sector number) LBA is [S0]. The sector number LBA requested is changed to [S1] so that the write request position is not overlapped with the region L1. Herein, as shown in FIG. 4, the size [a] of the region L1 is added to the sector number [S0], thereby obtaining the changed sector number [S1].

(S61) The CPU 2 judges whether or not the data (encrypted key data) in the region L1 on the optical disk 1 have already been read out. If already read out, the key data are developed in the operation region of the memory 3, and hence the processing proceeds to step S64.

(S62) The CPU 2, if the data in the region L1 have not been read out, executes the process of developing the key data in the operation region of the memory 3. Namely, the CPU 2 obtains the user password Pwi. Then, the CPU 2 reads the data from a region L1 and decodes the read data with the password Pwi. The password PW1 is thereby obtained on the optical disk 1.

(S63) Next, the CPU 2 reads the data PS'[1]–PS'[n] from the region L1 on the optical disk 1. The CPU 2 decodes the data PS'[1]–PS'[n] in the region L1 with the password PW1. The key data PS [1]–PS [n] are thereby obtained. The key data PS[ ] (PS [1]–PS [n]) are stored in the operation region of the memory 3.

(S64) The CPU 2 obtains four values R0, R1, R2, R3 from the sector number S0 requested. Herein, the logic sector number S0 is assumed to be a bit string of 32 bits, and 32 bits are rearranged by 8 bits to the individual values R0, R1, R2, R3. Then, with R0–R3 serving as an index, the random number values (key data) are taken out of PS[ ] in the operation region of the memory 3. Based on the thus taken-out four values, the 8-byte random number (key data) R is generated.

Herein, as shown in FIG. 9, the key data PS[R0] corresponding to R0 is taken out, and the key data [R1+256] corresponding to (R1+256) is taken out. The key data PS [R2+256] corresponding to R2 is taken out, and the key data PS [R3] corresponding to R3 is taken out. Then, the key data R is calculated by the above-described arithmetic formula.

(S65) Then, the CPU 2 encrypts the data to be written with this piece of key data R. The encrypting method may involve the use of known DES etc. The CPU 2 writes this piece of encrypted data to a position of the logical block address LBA (=S1) on the optical disk 1.

Thus, the plurality of user passwords can be used.

Figure 13:
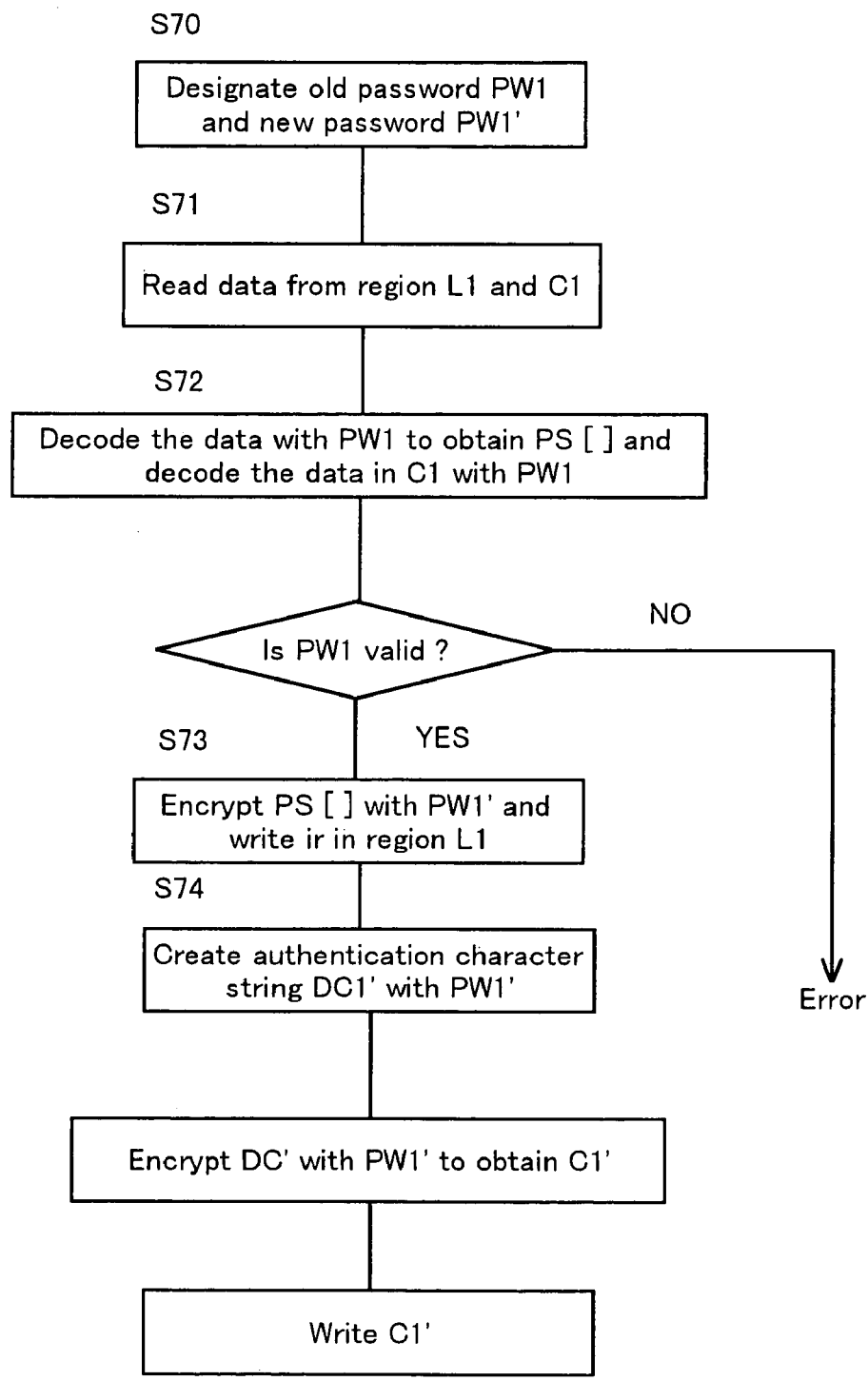
FIG. 13 is a flowchart (part 1) showing a password changing process in the fourth embodiment of the present invention.
Figure 14:
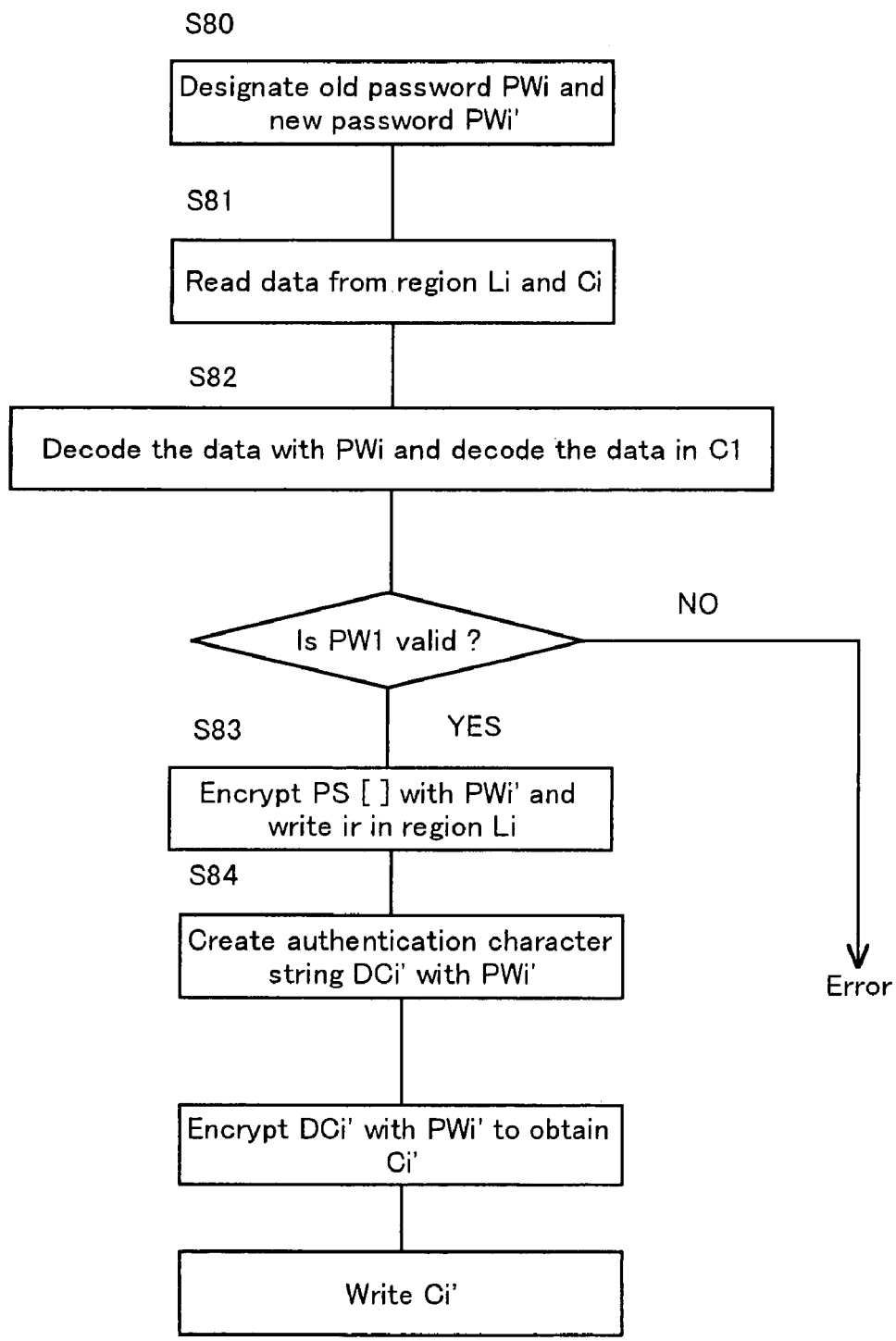
FIG. 14 is a flowchart (part 2) showing the password changing process in the fourth embodiment of the present invention.
Figure 15:
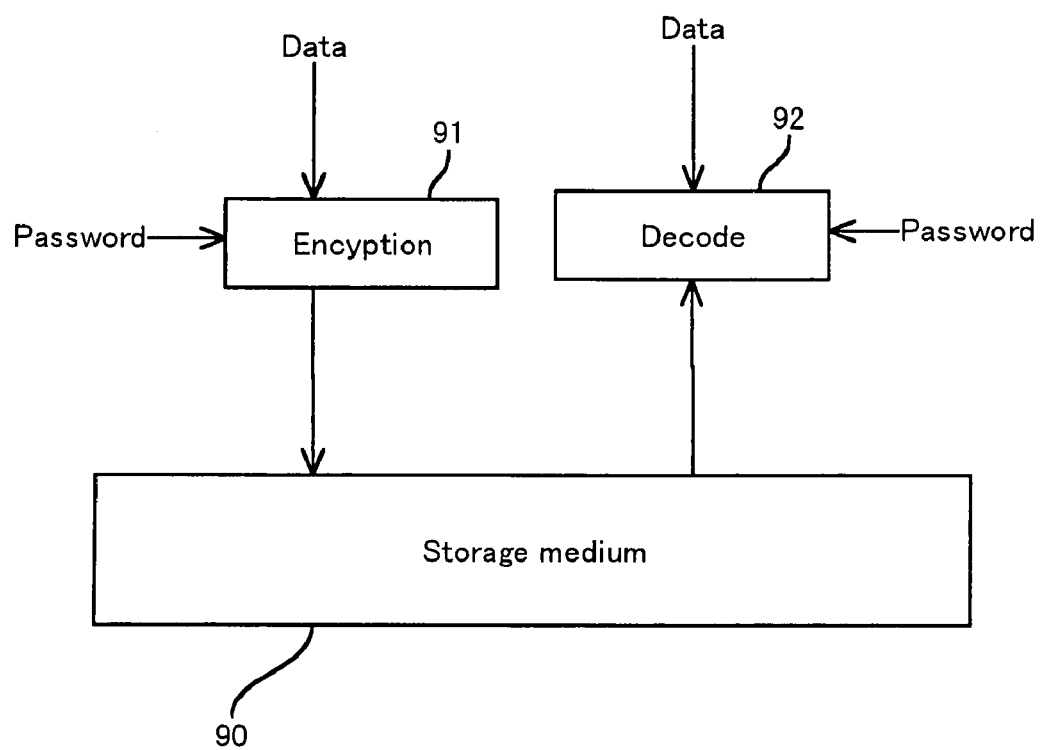
FIG. 15 is an explanatory diagram showing the prior art.

FIG. 13 is a flowchart (part 1) showing a password changing process in a fourth embodiment of the present invention. FIG. 14 is a flowchart (part 2) showing the password changing process in the fourth embodiment of the present invention.

In the construction shown in FIG. 11, a process of changing the user password PW1 will be explained with reference to FIG. 13.

(S70) The CPU 2 obtains the old password PW1 and a new password PW1' as well.

(S71) The CPU 2 reads the data from the regions L1 and C1 on the optical disk 1.

(S72) The CPU 2 decodes the encrypted key data in the region L1 with the password PW1, thereby obtaining the key data PS[ ]. Then, the CPU 2 decodes the data in the region C1 with the password PW1. Further, the CPU 2 judges from the decoded authentication character string whether the password PW1 is valid or not. If the password is invalid, there must be, it is conceived, an error.

(S73) The CPU 2 encrypts the key data PS[ ] with the new password PW1' and writes the encrypted data to the region L1 on the optical disk 1.

(S74) Next, the CPU 2 creates an authentication character string DC1' with respect to the new password PW1'. Then, the CPU 2 encrypts the authentication character string DC1' with the new password PW1', thereby obtaining a write value C1'. Further, the CPU 2 writes the write value C1' to the region C1 on the optical disk 1.

The old password, of which the validity is thus confirmed, can be changed to the new password. Besides, the password can be changed without any necessity for re-encryption of the data. This method is effective in the case of the user password being single.

In the case of setting the plurality of user passwords, when changed to the new password by executing the process in FIG. 13, no data access can be done by using the user passwords PW2–PWn. If this is inconvenient when the plurality of user passwords PW2–PWn are set, the password PW1 is not used as the user password, and only the user password PWi (i>1) may be used as the user password.

A process of changing this user password PWi (i>1) is explained with reference to FIG. 14.

(S80) The CPU 2 obtains the old password PWi and a new password PWi' as well.

(S81) The CPU 2 reads the data from the regions L1 and Ci on the optical disk 1.

(S82) The CPU 2 decodes the encrypted key data in the region L1 with the password PWi, thereby obtaining the password PW1. Then, the CPU 2 decodes the data in the region Ci with the password PWi. Further, the CPU 2 judges from the decoded authentication character string whether the password PWi is valid or not. If the password is invalid, there must be, it is conceived, an error.

(S83) The CPU 2 encrypts the password PW1 with the new password PWi' and writes the encrypted data to the region Li on the optical disk 1.

(S84) Next, the CPU 2 creates the authentication character string DCi' with respect to the new password PWi'. Then, the CPU 2 encrypts the authentication character string DCi' with the new password PWi', thereby obtaining a write value Ci. Further, the CPU 2 writes the write value Ci' to the region Ci on the optical disk 1.

The old password PWi, of which the validity is thus confirmed, can be changed. In this embodiment also, the password can be changed without any necessity for re-encryption of the data.

Other than the embodiment discussed above, the present invention can be modified as follows:

(1) The storage medium has bee explained so far in the form of the magneto-optic disk, and other applicable storage mediums may be an optical disk, a magnetic disk and an IC card etc.

(2) The arithmetic formula for obtaining the random number R may include an application of other arithmetic formulae.

The present invention has been discussed so far by way of the embodiments but may be modified in a variety of forms within the range of the gist of the present invention, and those modifications are not excluded from the scope of the present invention.

As discussed above, the present invention exhibits the following effects.

(1) The data is encrypted not by using the password directly as the encryption key but by using the key data generated separately from the password. Even if the cipher text is analyzed, the encrypted key data is merely decoded. Therefore, the password and the key data are analyzed with difficulty. This makes it possible to prevent the password from being decoded by analyzing the cipher text.

(2) Further, the encryption is executed by using the key data generated separately from the password, and therefore a different key can be imparted based on the logic sector unit by changing the key data with respect to one password. Hence, the data can be encrypted by using the different key per logic sector, whereby the confidentiality of the data can be enhanced.

(3) Moreover, the data is encrypted by use of the key data generated separately from the password, and therefore, even when the password is changed, the re-encryption of the data is not required. Hence, the password can be easily changed with respect to the storage medium having a capacity as large as several hundred mega bytes.

What is claimed is:

1. A storage medium data protecting method of protecting data on a storage medium having a plurality of unit storage areas, comprising:
    a step of generating a random key, encrypting said random key with a password, and writing said encrypted random key the storage medium;
    a step of encrypting the data with the generated random key, and writing the encrypted data to the storage medium;
    a step of reading said encrypted key from the storage medium;
    a step of decoding said encrypted key with said password; and
    a step of reading and decoding the data on the storage medium with the decoded key,
    wherein said random key generating step comprises:
    a step of generating a different random key for each unit storage area of the plurality of unit storage areas, so that said each unit storage area is assigned a different random key, and said assignment of said different random key to said each unit storage area being based on a particular unit storage area to which the data, once encrypted, is to be stored;
    a step of encrypting each of the different random keys with said password, and
    a step of writing each of the encrypted different random keys to the storage medium when initializing the storage medium,
    wherein said data encrypting step comprises a step of encrypting the data with said different random key data corresponding to its said particular unit storage area to write the data, and
    wherein said data decoding step comprises a step of decoding the data with said decoded key corresponding to said particular unit storage area where the data have been read.

2. A storage medium data protecting method according to claim 1, wherein said random key generating step comprises a step of generating said random key per logic sector on the storage medium.

3. A storage medium data protecting method according to claim 1, wherein said random key generating step comprises a step of generating different random keys for each writing to said plurality of unit storage areas.

4. A storage medium data protecting method according to claim 1, wherein said random key generating step comprises a step of generating said random keys by combining a predetermined number of pieces of random data.

5. A storage medium data protecting method according to claim 1, further comprising:
    a step of decoding, after reading said encrypted key from the storage medium, said encrypted data with an old password designated by a user; and
    a step of writing, after encrypting said decoded key with a new password designated by said user, the encrypted data to the storage medium.

6. A storage medium data protecting method according to claim 1, wherein said writing said encrypted random key to the storage medium comprises a step of encrypting said random key with each of a plurality of passwords, and writing said encrypted random keys to the storage medium, and said step of decoding the encrypted key comprises a step of decoding said encrypted key with a designated password.

7. A storage medium data protecting method according to claim 1, wherein said writing encrypted random key to d the storage medium comprises a step of encrypting said random key with a first password, writing the encrypted random key to the storage medium, encrypting said first password with a second password, and writing encrypted first password to the storage medium, and said step of decoding the encrypted key data comprises a step of decoding said encrypted first password with said second password, and obtaining said first password, and a step of decoding said encrypted key with obtained said first password.

8. The storage medium protecting method according to claim 1, said writing said encrypted key is performed for all unit storage areas of the storage medium when initializing the storage medium.

9. The storage medium protecting method according to claim 8, wherein said encrypting the data step comprises:
    a step of reading said encrypted key from the storage medium;
    a step of decoding the read encrypted key with said password; and
    a step of encrypting the data with the decoded key.

10. A storage medium data protecting apparatus for protecting data, comprising:
    a storage medium having a plurality of unit storage areas; and
    a control circuit for reading and writing the data from and to said storage medium, wherein said control circuit has:
a write mode of encrypting, after generating a random key, said random key with a password, writing the encrypted key to said storage medium, encrypting the data with the random key, and writing the encrypted data to said storage medium;
a read mode of decoding, after reading said encrypted key from said storage medium, the encrypted key with said password, and decoding the data on said storage medium with the decoded key,
wherein said write mode comprises a mode of generating a different random key for each unit storage area of said plurality of unit storage areas so that said each unit storage area is assigned a different random key, and the assignment of said different random key to said each unit storage area being based on a particular unit storage area to which the data, once encrypted, is to be stored, encrypting each of the different random keys with said password, writing each of the encrypted keys to said storage medium when initializing the storage medium, and encrypting the data with the random key corresponding to its said particular unit storage area to write the data,
wherein said read mode comprises a mode of decoding the data with the decoded key corresponding to said particular unit storage area where the data have been read.

11. A storage medium data protecting apparatus according to claim 10, wherein said storage medium is constructed of a storage medium from and to which the data is read and written per logic sector, and said control circuit generates said different random key per logic sector on said storage medium.

12. A storage medium data protecting apparatus according to claim 11, wherein said control circuit decodes, after reading said encrypted key from said storage medium, said encrypted key with an old password designated by a user, and writes, after encrypting said decoded key with a new password designated by the user, said encrypted key to said storage medium.

13. A storage medium data protecting apparatus according to claim 10, wherein said control circuit generates different random keys for each writing to said plurality of unit storage areas.

14. A storage medium data protecting apparatus according to claim 10, wherein said control circuit generates said different random keys by combining a predetermined number of pieces of random data.

15. A storage medium data protecting apparatus according to claim 10, wherein said control circuit has:
a write mode of encrypting said random keys with each of a plurality of passwords and writing the encrypted keys to said storage medium; and
a read mode of decoding the read/encrypted key with a designated password.

16. A storage medium data protecting apparatus according to claim 10, wherein said control circuit has:
a write mode of encrypting said key with a first password, writing said encrypted key to said storage medium, encrypting said first password with a second password, and writing the first encrypted password to said storage medium; and
a read mode of decoding said first encrypted password with said second password, obtaining said first password, and thereafter decoding said encrypted key with said first password.

17. An encoding method for protecting data on a storage medium having a plurality of unit storage areas, comprising:
a step of generating different random keys for each unit storage area of the storage medium, encrypting said different random keys with a password, and writing the encrypted keys to the storage medium;
a step of encrypting the data with a different random key corresponding to a particular unit storage area to which the data, once encrypted is to be written, and writing the encrypted data to the storage medium.

18. A decoding method for protecting data on a storage medium having a plurality of unit storage areas, wherein different keys are used for each unit storage area and the different keys are encrypted with at least one password, comprising:
a step of reading the different encrypted keys from the storage medium;
a step of decoding said different encrypted keys with the at least one password; and
a step of decoding the data on the storage medium with a particular decoded key corresponding to a particular unit storage area where the data, once encrypted have been read.

19. A storage medium data protecting method for protecting data on a removable storage medium having a plurality of unit storage areas, comprising:
a step of generating random keys, encrypting said random keys with a password, and writing the encrypted keys to the removable storage medium;
a step of encrypting the data on the removable storage medium with the generated random keys, and writing the encrypted data to the removable storage medium;
a step of reading said encrypted key from the removable storage medium;
a step of decoding said encrypted key with said password; and
a step of decoding and reading the data on the removable storage medium with the decoded encrypted key,
wherein said random key generating step further comprises:
a step of generating different random keys for each a unit storage area of the removable storage medium;
a step of encrypting each of said different random keys for said each unit storage area with said password; and
a step of writing each of the encrypted keys to the removable storage medium,
wherein the data encrypting step comprises a step of encrypting the data on the removable storage medium with a particular random key corresponding to a particular unit storage area to write the data, and
wherein the data decoding step comprises a step of decoding the data on the removable storage medium with said decoded encrypted key corresponding to said plurality of said particular unit storage area where the data, once encrypted, have been read.

20. A storage medium data protecting method of protecting data on a storage medium comprising:
a step of generating a random key, encrypting said random key with a password, and writing said encrypted random key to the storage medium;
a step of encrypting the data with the generated random key, and writing the encrypted data to the storage medium;
a step of reading said encrypted key from the storage medium;

a step of decoding said encrypted key with said password; and a step of decoding the data on the storage medium with the decoded key, wherein said writing encrypted key is performed for all unit storage areas of the storage medium when initializing the storage medium, and wherein said encrypting the data step comprises:

a step of reading said encrypted key from the storage medium;

a step of decoding the read encrypted key with said password; and a step of encrypting the data with the decoded key.

21. A storage medium data protecting apparatus for protecting data, comprising:

a storage medium having a plurality of unit storage areas; and a control circuit for reading and writing the data from and to said storage medium, wherein said control circuit has:

a write mode of encrypting, after generating a random key, said random key with a password, writing said encrypted random key to the storage medium, encrypting the data with the generated random key, and writing the encrypted data to the storage medium; and a read mode of decoding, after reading said encrypted key from the storage medium, said encrypted key with said password, and decoding the data on the storage medium with the decoded key, and wherein said write mode has a mode of performing to write encrypted key for all unit storage areas of the storage medium when initializing the storage medium, and wherein said write mode has a mode of reading said encrypted key from the storage medium, decoding the read encrypted key with said password, and encrypting the data with the decoded key.

* * * * *

UNITED STATES PATENT AND TRADEMARK OFFICE
CERTIFICATE OF CORRECTION

| | |
|---|---|
| PATENT NO. | : 7,051,213 B1 |
| APPLICATION NO. | : 09/187700 |
| DATED | : May 23, 2006 |
| INVENTOR(S) | : Kobayashi et al. |

Page 1 of 1

It is certified that error appears in the above-identified patent and that said Letters Patent is hereby corrected as shown below:

On the Title Face:

Item 56 under "Foreign Patent Documents" delete "JP 9335182 12/1996" and insert --JP 8335182 12/1996--.

In the Claims:

Col.11, line 48, delete "key the" and insert --key to the--.

Col. 12, line 5, delete "random key data" and insert --random key--.

Col. 12, lines 41-42, delete "said writing encrypted random key to d the storage" and insert --said writing said ecrypted random key to the storage--.

Signed and Sealed this

Twenty-sixth Day of December, 2006

JON W. DUDAS
*Director of the United States Patent and Trademark Office*